United States Patent [19]

Lutterbach et al.

[11] Patent Number: 4,932,988
[45] Date of Patent: Jun. 12, 1990

[54] AIR PURIFICATION APPARATUS

[75] Inventors: Rickey S. Lutterbach; Jeffrey A. Granacki, both of Michigan City, Ind.

[73] Assignee: Control Resource Systems, Inc., Michigan City, Ind.

[21] Appl. No.: 310,629

[22] Filed: Feb. 15, 1989

[51] Int. Cl.$^5$ ............................................. B01D 35/30
[52] U.S. Cl. ........................................ 55/356; 55/467; 55/490; 55/493
[58] Field of Search .................. 55/356, 359, 467, 471, 55/473, 490, 493

[56] References Cited

U.S. PATENT DOCUMENTS

| | | | |
|---|---|---|---|
| 2,863,524 | 12/1958 | Buda | 55/467 |
| 2,961,688 | 11/1960 | Descarries | 55/493 |
| 2,986,765 | 6/1961 | Ernolf et al. | 55/467 |
| 3,251,540 | 5/1966 | Kinsworthy | 55/467 |
| 3,795,092 | 3/1974 | Schwartz et al. | 55/473 |
| 3,844,741 | 10/1974 | Dimitrik | 55/467 |
| 3,861,894 | 1/1975 | marsh | 55/493 |
| 4,750,924 | 6/1988 | Potter | 55/473 |
| 4,778,496 | 10/1988 | Conrad | 55/356 |
| 4,786,295 | 11/1988 | Newman et al. | 55/471 |
| 4,838,910 | 6/1989 | Stollenwerk et al. | 55/467 |

Primary Examiner—Jay H. Woo
Assistant Examiner—C. Scott Bushey
Attorney, Agent, or Firm—Wood, Phillips, Mason, Recktenwald & Vansanten

[57] ABSTRACT

An air purification apparatus has an inner housing with an air inlet and an air outlet. Preferably the inner housing is fabricated as a one-piece molded plastic structure. A filter is mounted within the inner housing. A blower is mounted within the inner housing for drawing air in through the inlet, through the filter and out through the outlet. An outer housing is secured substantially about the inner housing with portions thereof spaced from the inner housing and having an air inlet and an air outlet communicating respectively with the air inlet and the air outlet of the inner housing. In the preferred embodiment, the outer housing is fabricated as a one-piece structure of molded plastic material, with integrally molded vertical reinforcing ribs, stackable detents on the top and the bottom of the housing, and a recessed integral ring about the outlet for storing an electrical cord. Closures are provided for the inlet and the outlet of the outer housing to seal the housing when the apparatus is not in use.

9 Claims, 3 Drawing Sheets

AIR PURIFICATION APPARATUS

FIELD OF THE INVENTION

This invention generally relates to air filtering systems and, particularly, to an improved air purification system of the blower type.

BACKGROUND OF THE INVENTION

Air purification systems or devices are known in which a housing, which may be a portable housing, provides an interior framework for the filtering system. The housing normally has an air inlet, an air outlet, a filtering medium between the inlet and the outlet, and means such as a blower for drawing air in through the inlet, through the filter medium and out through the outlet. Such filtering systems are used in practically any environment, including the home, office, workshop, medical facilities, and even for protection of poultry and domestic animals.

One of the most prolific areas in which air purification systems employ such air filtering apparatus is in the asbestos abatement industry. Such filtering or air purification apparatus include an air blower within the housing, usually in conjunction with a rather sizeable HEPA filter structure. Without going into great detail, HEPA filters have a 99.99 percent efficiency in removing particle material from the air in the 0.3 micron range and, consequently, are used predominantly in asbestos filtering apparatus.

Practically all air filtering or purification apparatus of the character described are fabricated the same. The housing is fabricated of sheet metal material, with the blower and filter components mounted within the housing by a number of mounting flanges, mounting brackets and the like. The flanges and brackets are separate sheet metal components which are secured, as by welding, rivets, screws or bolts within the outer sheet metal housing. Such constructions are rather crude, expensive to manufacture and very difficult to seal in an environment where leakage of asbestos fibers can cause a critical problem. The filtering units themselves, usually being portable and moved from site to site, often are "banged around" by workers, causing the sheet metal material to become dented and causing dislodgement or misalignment of the interior components.

This invention is directed to providing an improved air purification apparatus with a construction designed to address the various problems outlined above.

SUMMARY OF THE INVENTION

An object, therefore, of the invention is to provide a new and improved air purification apparatus of the character described.

In the exemplary embodiment of the invention, the apparatus includes an inner housing having air inlet means and air outlet means. As disclosed herein, the inner housing is fabricated in one piece of molded plastic material which can be contoured for mounting the interior components, such as a blower and a HEPA filter, directly to the inner housing itself without requiring extraneous mounting brackets, mounting flanges and the like. An outer housing is secured substantially about the inner housing with portions thereof spaced from the inner housing and having air inlet means and air outlet means communicating respectively with the air inlet means and air outlet means of the inner housing. As disclosed herein, the outer housing is fabricated of molded plastic material. In fact, in the preferred embodiment of the invention, the outer housing is formed of a one-piece structure substantially completely surrounding the inner housing except for the inlet means and outlet means thereof.

With a double housing construction as generally described above, a dead air space is provided between the inner and outer housing structures. The result is that a shock absorber affect is created should the unit be dropped or handled quite roughly, thereby further protecting the interior components. The apparatus is much easier to manufacture because the inner molded plastic housing can be formed, as desired, to facilitate mounting the interior components directly thereto and thereby eliminate the separate mounting flanges or brackets prevalent in the art. Both the unitarily molded inner housing and the unitarily molded outer housing are inherently sealed and the two housings are sealed together to remain air-tight. This is an important advantage in applications such as the asbestos abatement industry.

The unitary outer housing also is amenable to other features not presently available. For instance, such air filtration units often are vertically stacked in numbers depending upon the work area involved. A number of units may be stacked in a doorway of a room and sealed to prevent air leakage about the units. If the units are not readily stackable, misalignment occurs and the seals are broken, creating a hazardous condition when used in asbestos abatement projects. With the air purification apparatus of the invention, the unitarily molded outer housing has detent-type stacking components on the top and bottom walls thereof to provide for readily stacking of the entire units.

When such air purification apparatus are not in use, it is desirable to close the inlet and outlet ports in order to prevent any hazardous particles from within the unit from becoming airborne. This is very difficult to achieve with sheet metal housing structures which often become bent or dented through use. With the molded plastic structure of the invention, the inlet and the outlet of the outer housing are closed by doors or caps to seal the unit when not in use.

The molded outer housing also has a recessed area about the outlet port for storing the electrical cord for the unit. Still further, vertical ribs are molded integrally with the sidewalls of the outer housing for reinforcement purposes.

It can be seen from the above that the novel double walled construction of the invention provides a considerable number of advantages and/or features which simply would be impossible or cost prohibitive with the air purification devices presently available.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE PREFERRED EMBODIMENT

Figure 1:
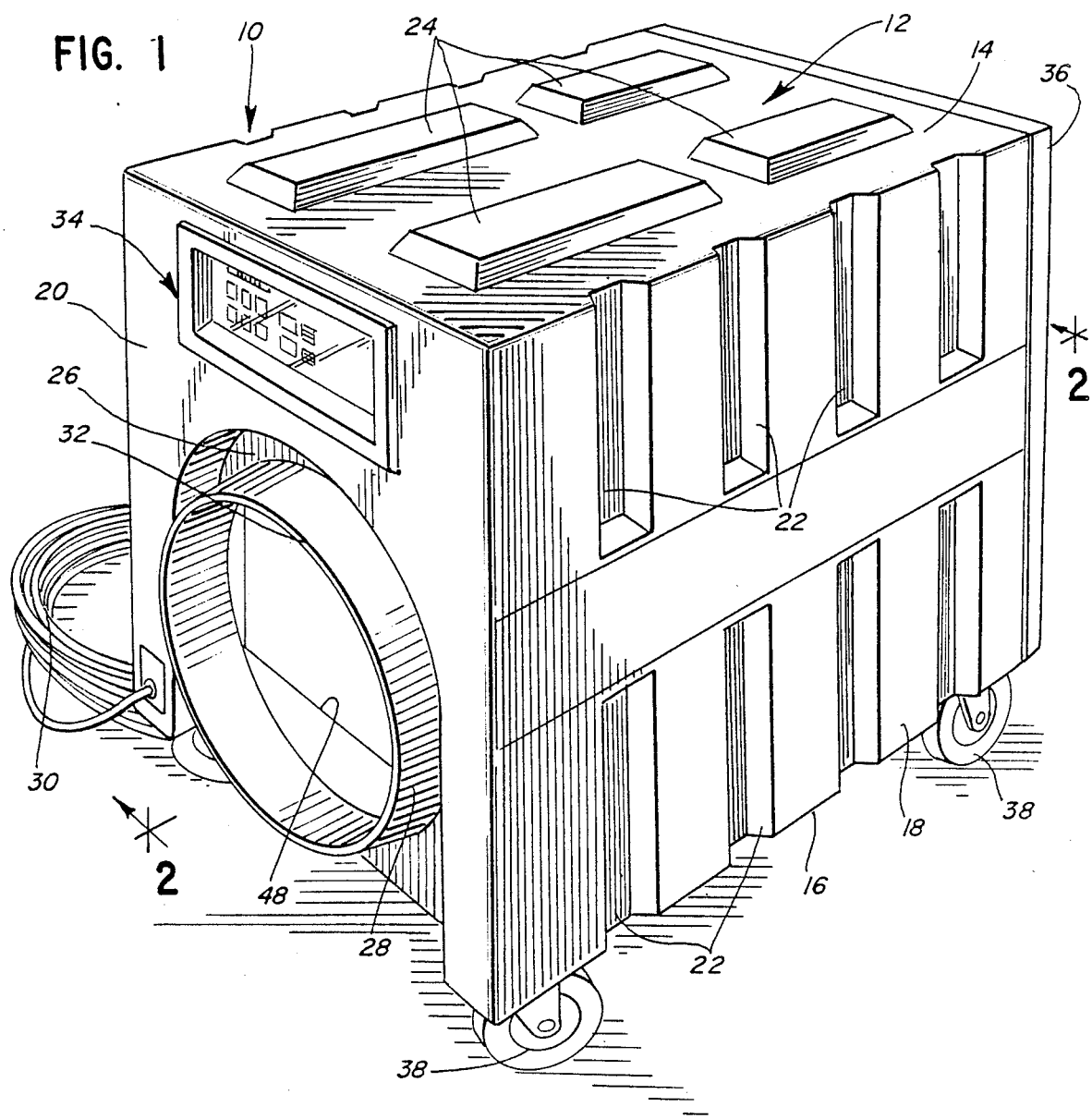
FIG. 1 is a perspective view of an air purification apparatus according to the invention.

Referring to the drawings in greater detail, and first to FIG. 1, an air filtering or purification apparatus is shown embodying the concepts of the invention and is generally designated 10. As stated above, the apparatus is fabricated with a double housing construction and, consequently, what is most visible in FIG. 1 is an outer housing, generally designated 12 and for receiving one end of a flexible duct positioned thereabout. The outer housing has a top wall 14, a bottom wall 16, a pair of identical, opposite side walls 18 and a front wall 20. Outer housing 12 is fabricated as a unitary, one-piece structure of molded plastic material, such as polyethylene. As will be described in greater detail, side walls 18 have integrally molded vertical ribs 22 for reinforcing purposes; top wall 12 has integrally molded projecting portions 24 which cooperate with recesses (described hereinafter) in bottom wall 16 to provide a detent-type stacking means; and front wall 20 has a circular recess 26 about a circular flange 28 for storing an electrical cord 30. Circular flange 28 defines an outlet port 32 for outer housing 12. A control panel, generally designated 34, also is shown in front wall 20. Outlet port 32 can be closed by a closure cap (described hereinafter) to seal the apparatus when not in use. Two edges of a hinged door 36 also are visible in FIG. 1 and will be described hereinafter. Lastly, the apparatus is portable and four wheels 38 are provided beneath housing 12, secured to bottom wall 16.

Figure 2:
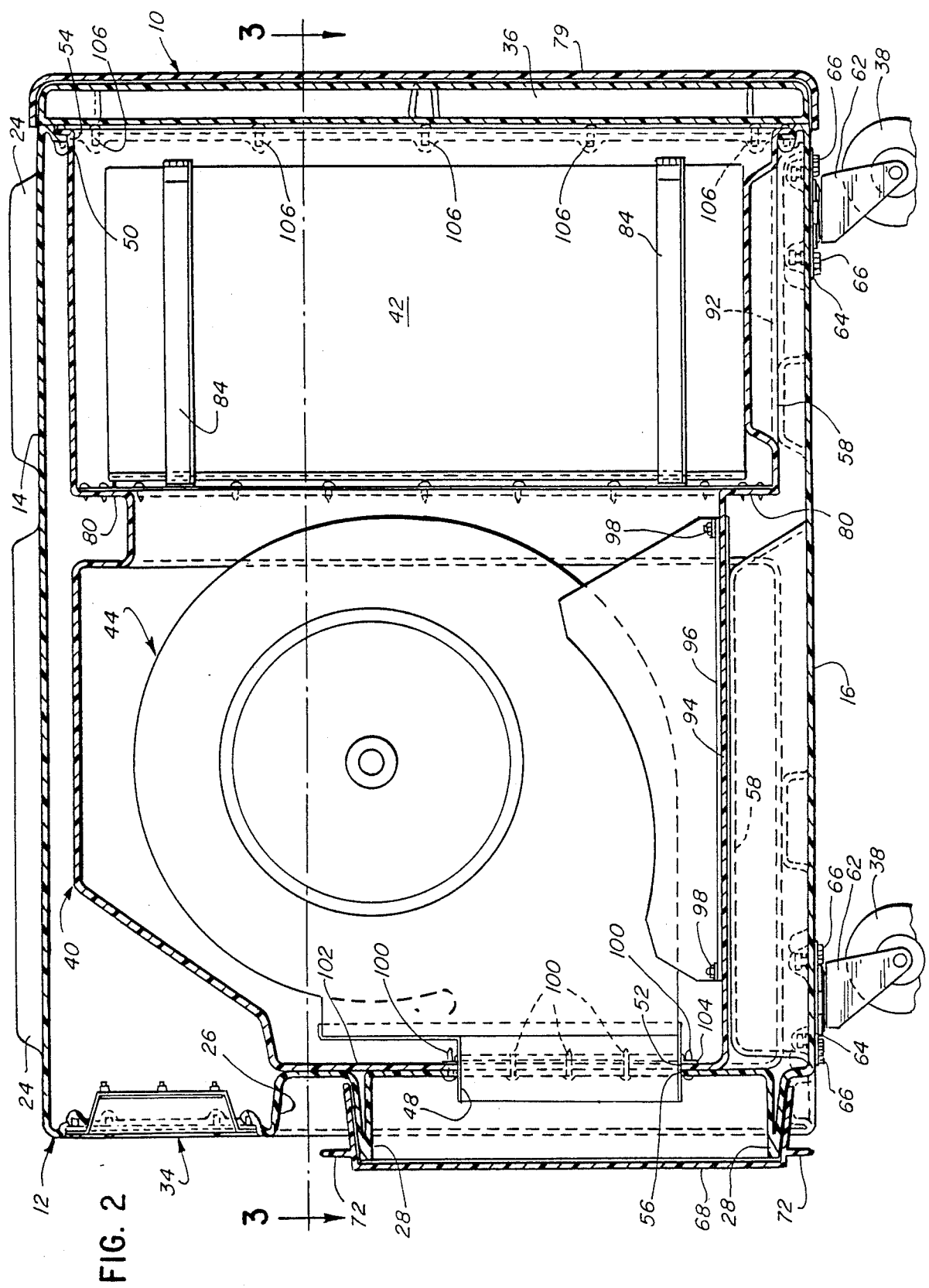
FIG. 2 is a vertical section, on an enlarged scale, taken generally along line 2—2 of FIG. 1.
Figure 3:
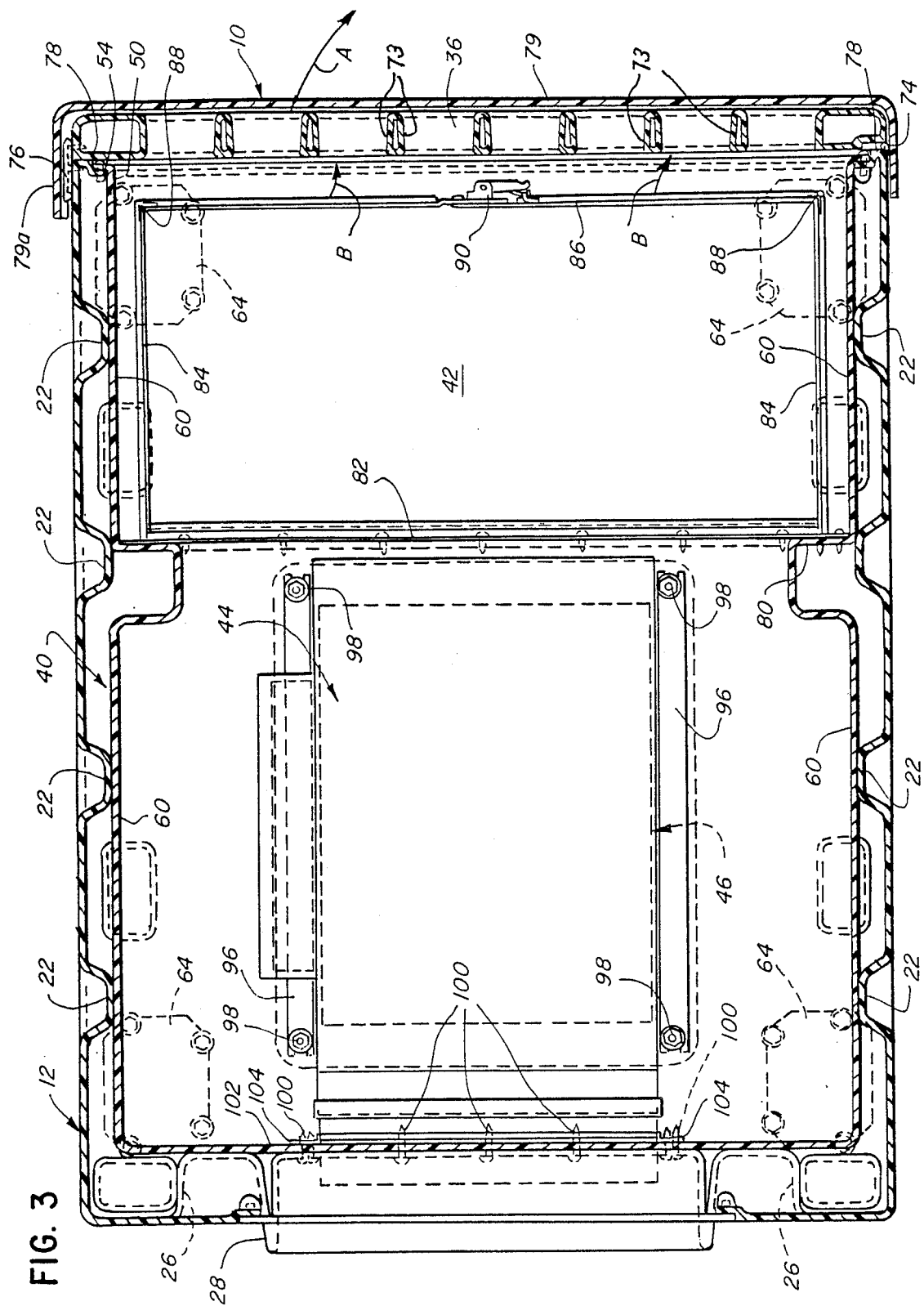
FIG. 3 is a horizontal section taken generally along line 3—3 of FIG. 2.

Referring to FIGS. 2 and 3, which respectively represent generally central vertical and horizontal sections through apparatus 12, the surrounding relationship of molded outer housing 12 can be seen in relation to an inner housing, generally designated 40. Generally, inner housing 40 is fabricated in one piece of formed, molded plastic material such as polyethylene. A filter 42 and a blower, generally designated 44, are mounted within inner housing 40. Blower 44 is shown of the centrifugal type and includes an inlet 46 (FIG. 3) and an outlet 48 (FIG. 2). Inner housing 40 has an air inlet 50 and an air outlet 52. Outer housing 12 has an air inlet 54 and an air outlet 56 (FIG. 2). It can be seen that air inlets 50 and 54 of the inner and outer housings, respectively, are in juxtaposed location, and outlet 48 of blower 44 extends through outlets 52 and 56 of the inner and outer housings, respectively. Therefore, it can be understood that blower 44 is effective to draw air in through inlets 50,54, through filter 42, and out through outlets 48,52,56.

Referring back to the features of outer housing 12 described in relation to FIG. 1, FIG. 2 shows projecting portions 24 protruding upwardly from top wall 14. Bottom wall 16 has complementarily shaped recesses 58 for receiving projecting portions 24 of a vertically stacked, subjacent apparatus in a nesting fashion. Recesses 58 are deep enough to receive projecting portions 24 of a subjacent stacked unit, and the peripheral or lateral dimensions of recesses 58 abut the sides of projecting portions 24 to precisely align the stacked units and prevent horizontal relative movement. As can be seen, the sides of the projecting portions and the recesses are complimentarily inclined to provide for guiding the projecting portions into the complementarily shaped recesses.

FIG. 3 shows integrally molded reinforcing ribs 22 of outer housing 12, and it can be seen that the interior surfaces of the reinforcing ribs abut side walls 60 of the inner molded housing 40. Therefore, not only do ribs 22 vertically reinforce the outer housing, but the ribs provide lateral stability and positioning of inner housing 40.

FIG. 2 shows that wheels 38 include brackets 62 having flat plates 64 secured, as by bolts 66, to bottom wall 16 of outer housing 12. Therefore, the wheels are readily removable to permit stacking of a plurality of units.

FIGS. 2 and 3 also show a closure cap 68 for press fitting about circular flange 28 in order to seal the outlet means of the apparatus when the apparatus is not in use. This is the "clean" side of the unit. Therefore, when discharge air is not present, the cap should be maintained in place closing the outlet. In other words, blower outlet 48, inner housing outlet 52 and outer housing outlet 56 all are closed and sealed together and the cap should keep the interior area clean when the apparatus is not in operation. In addition, it can be seen that the closure cap has a peripheral ring portion 72 projecting radially outwardly from circular flange 28. This ring portion facilitates the retaining of electrical cord 30 when wrapped about circular flange 28 within recess 26 thereabout.

Inlets 50 and 54 of inner housing 40 and outer housing 12, respectively, are sealed together and closable by door 36 described briefly in relation to FIG. 1. More particularly, door 36, like outer housing 12, is fabricated of molded plastic material which is considerably more unyielding than sheet metal material. The door has inlet aperture means, as at 73 (FIG. 3), but protects the interior components of the unit. As seen in FIG. 3, door 36 is hinged, as at 74, for swinging open in the direction of arrow "A". This allows for ample access to the interior of the unit, such as for changing filters. The door is closed and secured by a toggle latch 76 to tightly retain the door against a peripheral edge 78 of outer housing 12 about the inlet 54 thereof.

As seen in FIGS. 2 and 3, a closure cap 79 is press fit over apertured door 36 and against a portion of outer housing 12 in order to seal the inlet means to the apparatus when not in use. This is the "dirty" side of the unit and it is important to prevent escape of particulate contaminants from the interior of the unit. Cap 79 has enlarged areas 79a to accommodate toggle latches 76.

FIGS. 2 and 3 also clearly show how irregularly shaped inner housing 40 can be formed by molding to provide various integral flanges, shoulders and the like for positioning filter 42 and blower 44. Without outer housing 12, it can be seen how "ugly" a structure the inner housing would comprise. On the other hand, it can clearly be seen how all of the separate mounting brackets, mounting flanges, L-supports and other means of the prior art, such as sheet metal components, are completely eliminated, thereby eliminating the extensive and expensive fabricating steps required in such prior apparatus.

For instance, inner housing 40 has a formed flange 80 against which a securing strap for filter 42 is mounted. The securing strap includes a back portion 82, two side portions 84, and a split front portion including strap sections 86. Each strap section 86 is secured by hinges 88 to side portions 84. Strap sections 86 are releasably connecting by a toggle latch 90. Therefore, latch 90 can be released, strap sections 86 pivoted outwardly in the direction of arrows "B", and filter 42 can be readily removed through outlets 50,54 upon opening door 36.

FIG. 2 shows that inner housing 40 also has a bottom wall portion 92 for supporting the weight of filter 42. It also can be seen in this figure that there actually are a pair of securing straps, including side portions 84, for securely holding filter 42 in place.

Still further, inner housing 40 has a second bottom wall portion 94 for supporting blower 44. The blower has a bottom mounting bracket 96 (also seen in FIG. 3) for securing the blower, as by bolts 98 to bottom wall portion 94 of the inner housing.

It can be seen in FIG. 2 that bottom wall portions 92 and 94 of the inner housing rests on the top walls of recesses 58 to support the inner housing and its interior components (i.e. filter 42 and blower 44) in a vertical direction.

With the inner housing supported in a vertical direction as described immediately above, and with the inner housing being supported in a horizontal direction by reinforcing ribs 22 of outer housing 12, it can be seen in FIGS. 2 and 3 that the only means necessary for securing the entire inner housing within the outer housing is by means of sheet metal screws 100 which extend through the outer housing, a front wall portion 102 of the inner housing and fixedly into a flange 104 of the blower discharge. In addition, inserts 106 (FIG. 2) are molded into the outer housing and machine screws are used to fasten through the inner housing and into the molded inserts. The molded unitary housings thereby are secured together at opposite ends. The ease of assembly is readily apparent, particularly in comparison to the tedious assembly procedures of the sheet metal structures of the prior art.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

We claim:

1. An air purification apparatus, comprising:
   inner housing means having air inlet means and air outlet means;
   filter means and means for mounting the filter means within the inner housing means;
   blower means for drawing air in through the inlet means, through the filter means and out through the outlet means and means for mounting the blower means within the inner housing means; and
   a one-piece molded outer housing secured substantially about the inner housing means with portions thereof spaced from the inner housing means and having air inlet means and air outlet means communicating respectively with the air inlet means and the air outlet means of the inner housing means, the outer housing having top and bottom walls including complementarily interengageable detent means for stacking one air purification apparatus on top of another.

2. An air purification apparatus, comprising:
   housing means having air inlet means and air outlet means;
   filter means in the housing means;
   blower means in the housing for drawing air in through the inlet means, through the filter means and out through the outlet means;
   wherein the housing has top and bottom wall means including complementarily interengageable detent means for stacking, one air purification apparatus on top of another; and
   removable wheel means on the bottom of the housing to provide for portability of the apparatus and providing for stacking of plural apparatus upon removal of the wheel means.

3. The air purification apparatus of claim 2 wherein said complementarily interengageable detent means comprise projecting portions on the top wall of the housing and complementary recessed portions in the bottom wall of the housing.

4. An air purification apparatus, comprising:
   inner housing means having air inlet means and air outlet means;
   filter means and means for mounting the filter means within the inner housing means;
   blower means for drawing air in through the inlet means, through the filter means and out through the outlet means and means for mounting the blower means within the inner housing means; and
   outer housing means secured substantially about the inner housing means with portions thereof spaced from the inner housing means and having air inlet means and air outlet means communicating respectively with the air inlet means and the air outlet means of the inner housing means, said outer housing means being fabricated of molded plastic material and having top wall means and bottom wall means including integrally molded, complementarily interengageable nesting detent means for stacking one air purification apparatus on top of another.

5. An air purification apparatus, comprising:
   inner housing means having air inlet means and air outlet means;
   filter means and means for mounting the filter means within the inner housing means;
   blower means for drawing air in through the inlet means, through the filter means and out through the outlet means and means for mounting the blower means within the inner housing means; and
   outer housing means secured substantially about the inner housing means with portions thereof spaced from the inner housing means and having air inlet means and air outlet means communicating respectively with the air inlet means and the air outlet means of the inner housing means, said outer housing means having top and bottom wall means including complementarily interengageable nesting detent means for stacking one air purification apparatus on top of another.

6. An air purification apparatus, comprising:
   inner housing means having air inlet means and air outlet means;
   filter means and means for mounting the filter means within the inner housing means;
   blower means for drawing air in through the inlet means, through the filter means and out through the outlet means and means for mounting the blower means within the inner housing means;
   a one-piece molded outer housing secured substantially about the inner housing means with portions thereof spaced from the inner housing means and having air inlet means and air outlet means communicating respectively with the air inlet means and the air outlet means of the inner housing means, the outer housing having top and bottom walls including complementarily interengageable detent means for stacking one air purification apparatus on top of another; and wheel means at the bottom of said outer housing, and means for removably securing the wheel means to the outer housing to permit said stacking.

7. An air purification apparatus, comprising:

inner housing means having air inlet means and air outlet means;

filter means and means for mounting the filter means within the inner housing means;

blower means for drawing air in through the inlet means, through the filter means and out through the outlet means and means for mounting the blower means within the inner housing means; and a one-piece molded outer housing secured substantially about the inner housing means with portions thereof spaced from the inner housing means and having air inlet means and air outlet means communicating respectively with the air inlet means and the air outlet means of the inner housing means, the outer housing having top and bottom walls including complementarily interengageable detent means for stacking one air purification apparatus on top of another, the detent means of the bottom walls comprising recessed portions thereof, and the inner housing means being supportable directly on said recessed portions.

8. An air purification apparatus, comprising:

a one-piece molded inner housing means having air inlet means and air outlet means;

filter means and means for mounting the filter means within the inner housing means;

blower means for drawing air in through the inlet means, through the filter means and out through the outlet means and means for mounting the blower means within the inner housing means; and a one-piece molded outer housing secured substantially about the inner housing means with portions thereof spaced from the inner housing means and having air inlet means and air outlet means communicating respectively with the air inlet means and the air outlet means of the inner housing means, the outer housing having top and bottom walls including complementarily interengageable detent means for stacking one air purification apparatus on top of another.

9. An air purification apparatus, comprising:

housing means having top wall means, bottom wall means and side wall means with air inlet means and air outlet means in the side wall means, the top and bottom wall means including complementarily interengageable nesting detent means for stacking one air purification apparatus on top of another;

filter means mounted within the housing means; and blower means within the housing means for drawing air in through the inlet means, through the filter means and out through the outlet means.

* * * * *